United States Patent [19]
Odoi et al.

[11] Patent Number: 5,250,882
[45] Date of Patent: Oct. 5, 1993

[54] SUNSHADE OPEN/CLOSE CONTROL DEVICES FOR VEHICULAR SUN ROOFING APPARATUS

[75] Inventors: Kozo Odoi, Aki; Akefumi Takeda, Kamo, both of Japan

[73] Assignee: Mazda Motor Corporation, Hiroshima, Japan

[21] Appl. No.: 903,737

[22] Filed: Jun. 24, 1992

[30] Foreign Application Priority Data

Jun. 27, 1991 [JP] Japan .................. 3-157101

[51] Int. Cl.[5] .................. B60J 7/047; B60J 7/057
[52] U.S. Cl. ....................... 318/467; 318/51; 318/266; 318/286; 318/468; 296/223
[58] Field of Search .............. 318/264, 265, 266, 286, 318/466, 467, 468, 626, 34, 51, 53, 54, 101; 296/210, 216, 217, 218, 219, 220, 221, 222, 223

[56] References Cited

U.S. PATENT DOCUMENTS

| | | | |
|---|---|---|---|
| 4,671,564 | 6/1987 | Sumida et al. | 296/214 |
| 4,679,846 | 7/1987 | Lux et al. | 296/214 |
| 4,702,518 | 10/1987 | Paerisch et al. | 296/217 |
| 4,844,534 | 7/1989 | Boots | 296/214 |
| 4,923,244 | 5/1990 | Clenet | 296/214 |
| 4,925,238 | 5/1990 | Thaler | 296/218 |
| 4,936,623 | 6/1990 | Huyer | 296/220 |

FOREIGN PATENT DOCUMENTS 63-28722 2/1988 Japan .

*Primary Examiner*—Bentsu Ro
*Attorney, Agent, or Firm*—Sixbey, Friedman, Leedom & Ferguson

[57] ABSTRACT

A vehicular sun roofing apparatus including a roofing panel (3) for tilting up and sliding and a sunshade member (4) for sliding is provided to open/close an opening (2) formed on a vehicular roof (1). The panel (3) is operated by an electrical means in response to input acts on a panel open/close switch (19, 20), and the sunshade (4) is operated by an electrical means in response to input acts on a sunshade switch (21, 22), wherein control devices (23, 40) for actions of the panel (3) and sunshade (4) are provided, and an ON act on the panel opening switch (19) causes not only opening action of the panel (3), but also selective opening action of the sunshade (4) to arrive at a predetermined point, depending on a location of the sunshade (3) at the switched moment.

16 Claims, 6 Drawing Sheets

FIG. 3

| Position of Panel | Full Close(A) | Ajar Tilt(B) | Tilt-Up(C) | Tilt-Up & Ajar Open(E) | Tilt-Up & Full Open(D) |
|---|---|---|---|---|---|
| Limit Switch(15) | | ON | | OFF | |
| Limit Switch(16) | OFF | ON | | OFF | |
| Open Process | | | Stop | | Motor Idling |
| Close Process | Motor OFF | | | | |

FIG. 4

| Position of Sunshade | Full Close(F) | First Ajar(H) | 50mm Ajar(I) | Second Ajar(J) | Full Open(G) |
|---|---|---|---|---|---|
| Limit Switch(17) | | ON | | OFF | |
| Limit Switch(18) | | ON | | | |
| Open Process | | | Stop | | Motor OFF |
| Close Process | Motor Idling | | Stop | | |

# SUNSHADE OPEN/CLOSE CONTROL DEVICES FOR VEHICULAR SUN ROOFING APPARATUS

FIELD OF THE INVENTION

This invention relates to control devices for vehicular sun roofing apparatus, in particular, to an apparatus for controlling opening degrees of a sunshade member included in a sun roofing apparatus equipped with a vehicle.

DESCRIPTION OF THE RELATED ART

In the art of controlling an opening degree of a sunshade member carried on a vehicle, the prior art has been known which is disclosed in Japanese Unexamined Patent Publication Sho 63-28722. Specifically, the vehicular sun roofing apparatus is equipped with a vehicle including a roofing panel and a sunshade member to open/close an opening provided with the roof, wherein the roofing panel is designed to operate or open/close by the motor drive in response to manual switching acts, instead of manual opening/closing actions, but the operation of the sunshade plate requires manual opening/closing actions basically. Non-manual operation of the sunshade member is limited only in an opening process, which is mechanically connected with the opening action of the roofing panel.

Disadvantages found with the prior art are that the opening degrees of the sunshade member can not be controlled nonmanually at the disposal of a driver or any person in the vehicle, and that, in the design of mechanical connection of the sunshade with the sun roofing, the mechanism is necessarily complex, which drawback forms an impediment for making the whole sun roofing apparatus thinner or in less height.

SUMMARY OF THE INVENTION

An aspect of the present invention is to offer an apparatus for making convenience in open/close actions of a sunshade member by performing such actions with use of electrical means so that improvement in adjusting opening degrees by the apparatus is obtained, and in a resultant apparatus, to achieve down-sizing of the apparatus as a whole, particularly, less vertical size.

The invention features that, in a sun roofing apparatus including a roofing panel and a sunshade member to open/close an opening provided with a vehicular roof and in the apparatus which is designed to operate the roofing panel or the sunshade member by the motor drive in response to manual switching acts, switches for operating the roofing panel and the sunshade member are provided, and in addition to the means so far, electrical control devices are introduced so that a switching act to open the roofing panel causes not only working to open the sun roofing panel, but also selective working of the sunshade motor to open the sunshade member to arrive at a predetermined opening degree, depending on a location taken by the sunshade member at the switched moment.

According to the present invention, open/close actions of the sunshade member is performed only by a manual switching act on the sunshade switch, by which the sunshade motor drives, with aid of the control device, the sunshade member for either opening or closing. Thereby the convenience is offered in opening/closing of the sunshade member and the target is achieved in making the sun roofing apparatus as a whole thinner.

BRIEF DESCRIPTION OF THE DRAWINGS

FIG. 3 is a diagram to explain the time courses of actions by the control device to open/close the roofing panel.

FIG. 4 is a diagram to explain the time courses of actions by the control devices to open/close the sunshade member.

These drawings are presented for illustrating the invention, and therefore, these should not be construed as limiting the invention.

DETAILED DESCRIPTION OF THE EMBODIMENT(S) OF THE PRESENT INVENTION

Figure 1:
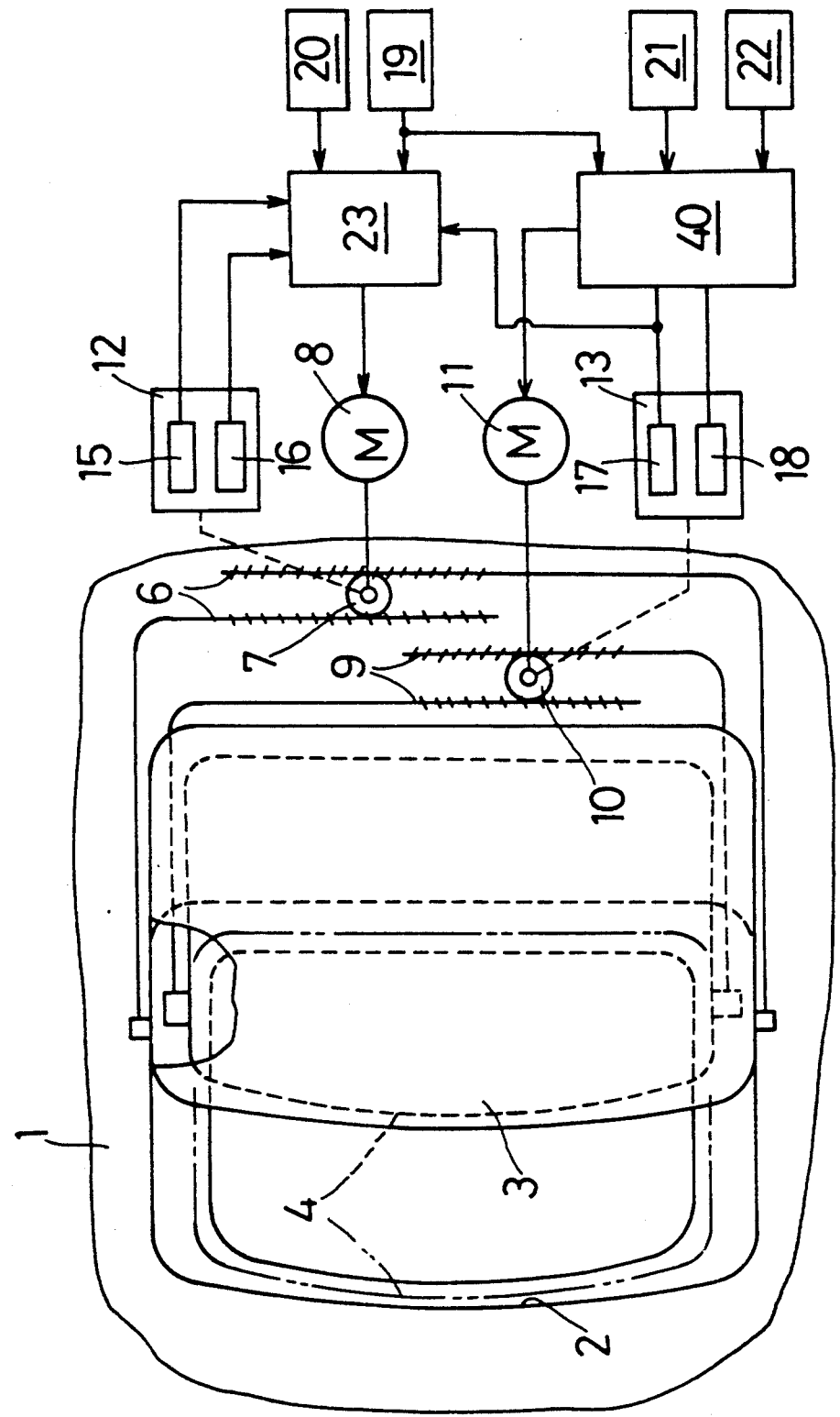
FIG. 1 is a schematic plan view of a vehicular sun roofing apparatus which is connected with a schematic diagram of control devices therefor.
Figure 2:
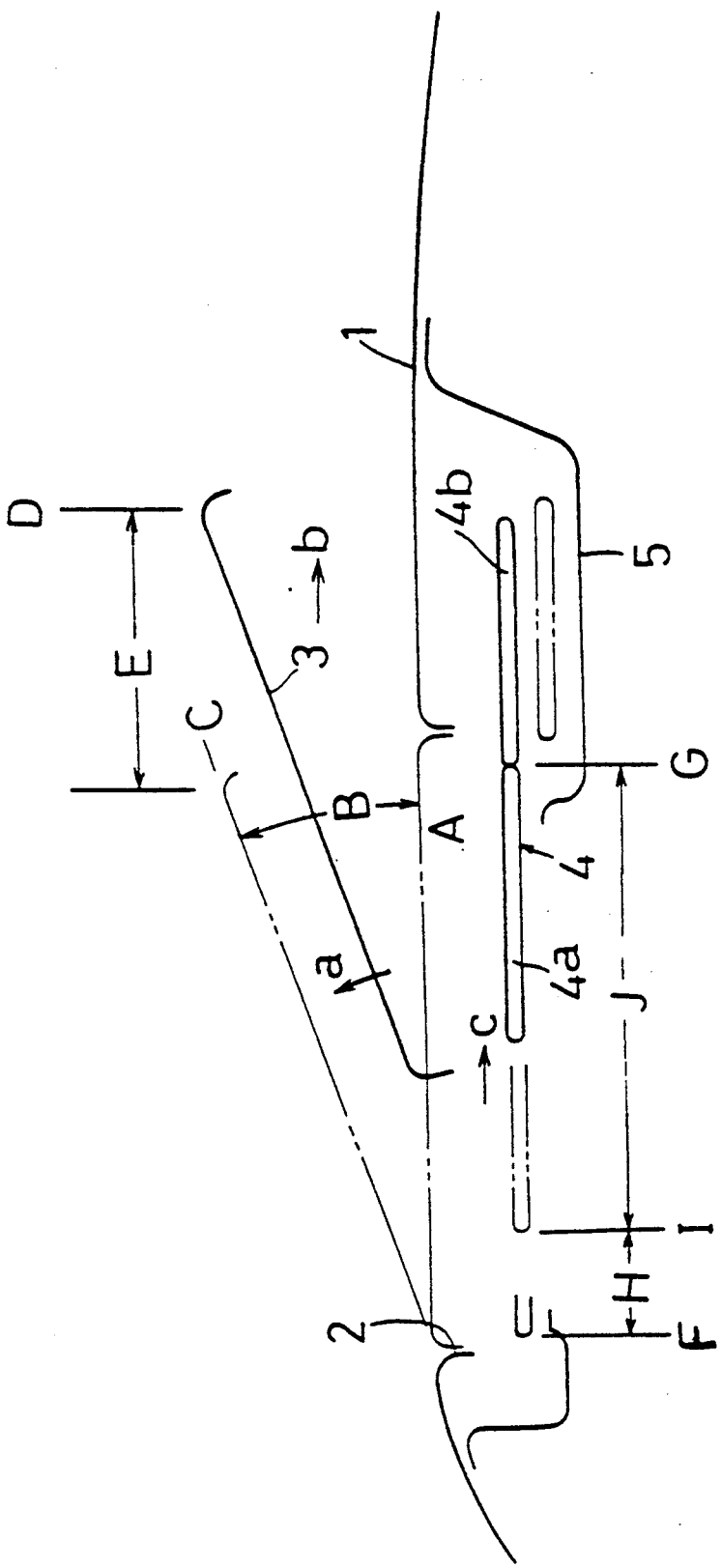
FIG. 2 is a diagrammatic side view of a sun roofing apparatus to explain actions of a roofing panel and a sunshade member schematically.

In the following, embodiments of the present invention will be described with reference to the drawings. In FIGS. 1 and 2, 2 designates a margin to define an opening or aperture provided with a roof 1 of a vehicle, and the opening 2 is permitted to be open or close with two means, that is, a roofing panel 3 and a sunshade member 4 which are customarily made of glass. 5 designates a mounting frame mounted under the roof 1 to surround the opening 2. As is seen in FIG. 2, in a space between the roof 1 and the frame 5, the panel 3 and the sunshade 4 are disposed.

The panel 3 is permitted to take such tilting and opening behaviors as starting at a position A to close the whole area of the opening 2 and pivoting upward about its front edge, passing through ajar tilt positions B, to arrive at a tilt up position C, and further sliding backward, with the tilt angle kept, to a tilt-up and full open position D through tilt-up and ajar open positions E along guide rails, not shown. Then, the sunshade 4 is made of two halved members 4a, 4b and is permitted to take such sliding behaviors along guide rails, not shown, as starting at a full close position F to arrive at a full open position G, during which course the sunshade 4 passes first ajar positions H and a 50 mm ajar position I (or a median ajar position I), and second ajar positions J.

Therein, as is seen in FIG. 1, the panel 3 is fastened with a pair of cables 6, 6, arranged at two sides, of which threaded portions are disposed in anti-parallel and are engaged with a gear 7 to form a drive line by a motor 8 for the panel actions, wherein the motor 8 is of reversible type, by which the panel 3 is driven to open/close in both ways. Similarly, the sunshade 4 is driven to open/close in both ways with aid of cables 9, 9, a gear 10, and a reversible motor 11.

Further, each gear 7, 10 has a shaft drivably connected to a position detective unit 12, 13 of the cam drive type to detect which positions are taken by the panel 3 and the sunshade 4. Each position detective unit 12, 13 is provided with limit switches 15, 16: 17, 18 to act the ON/OFF switchings as shown in FIGS. 3 and 4.

Referring specifically thereto, the limit switch 15 is ON, as FIG. 3 shows, while the panel 3 is located at the full close position A and at any ajar tilt positions B, and is OFF while located at the tilt-up position C, through the tilt-up and ajar open positions E, to arrive at the tilt-up and full open position D. Limit switch 16 is ON while the panel 3 is located in the ajar tilt positions B to arrive at the tilt-up position C, and is OFF while located at the full close position A, and also in the tilt-up and ajar open positions E and at the tilt-up and full open position D. The limit switch 17 is, as shown in FIG. 4, ON while the sunshade 4 is located from the full close position F to the 50 mm ajar position I (the state that first 50 mm is open) through the first ajar positions H, and is OFF while in the second ajar positions J and at the full open position G. The limit switch 18 is OFF while located at the full close position F and at the full open position G, and is ON in the other positions (H, I, J) than those noted for the OFF. The numeral 19 designates a switch for opening the panel 3, 20 does a switch for closing the panel 3. And 21, 22 are each a switch for opening and closing the sunshade 4. These switches 19 to 22 are designed to be ON only while acted on manually.

Figure 5:
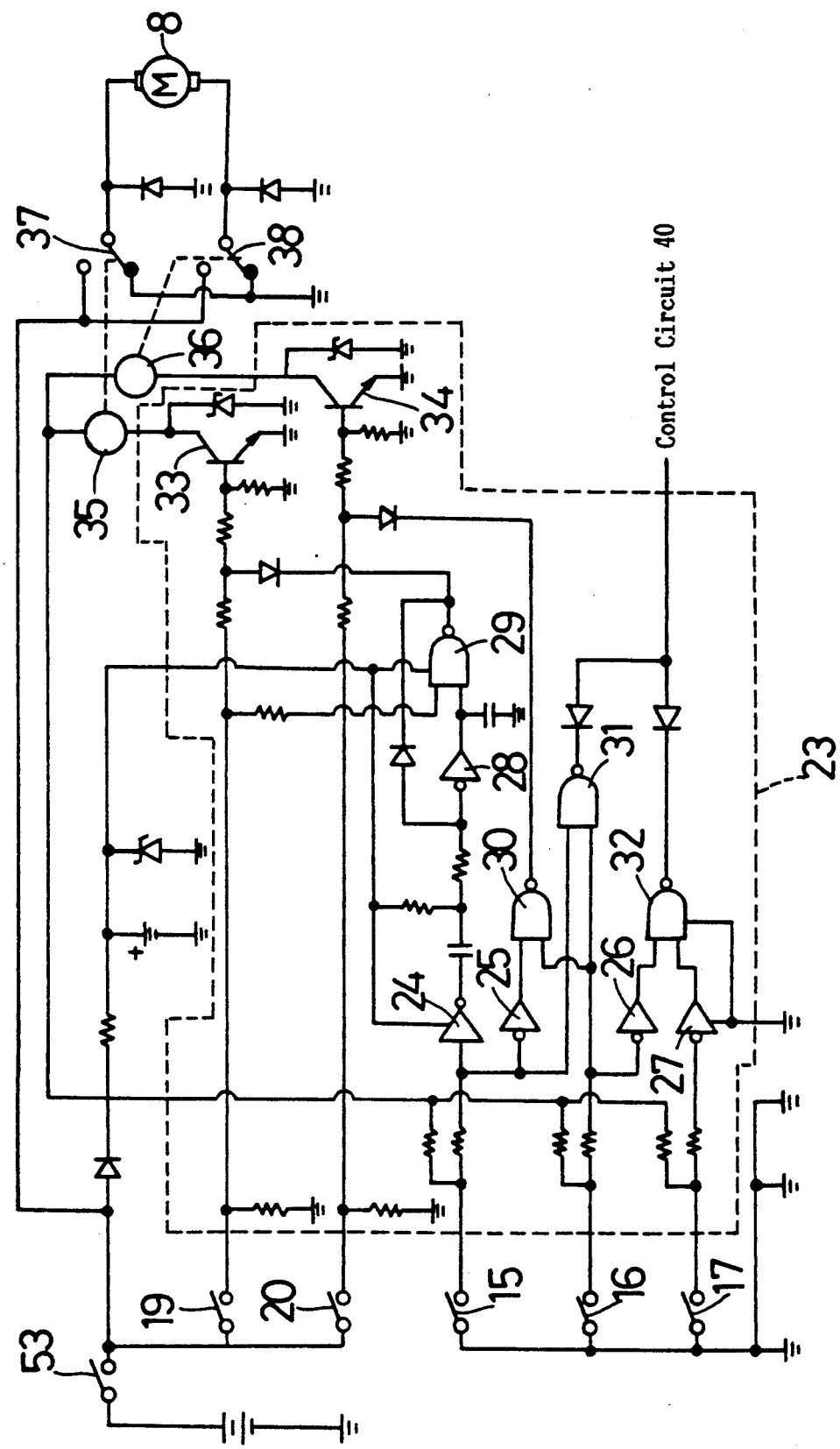
FIG. 5 is a circuit diagram for controlling a motor to drive the roofing panel.
Figure 6:
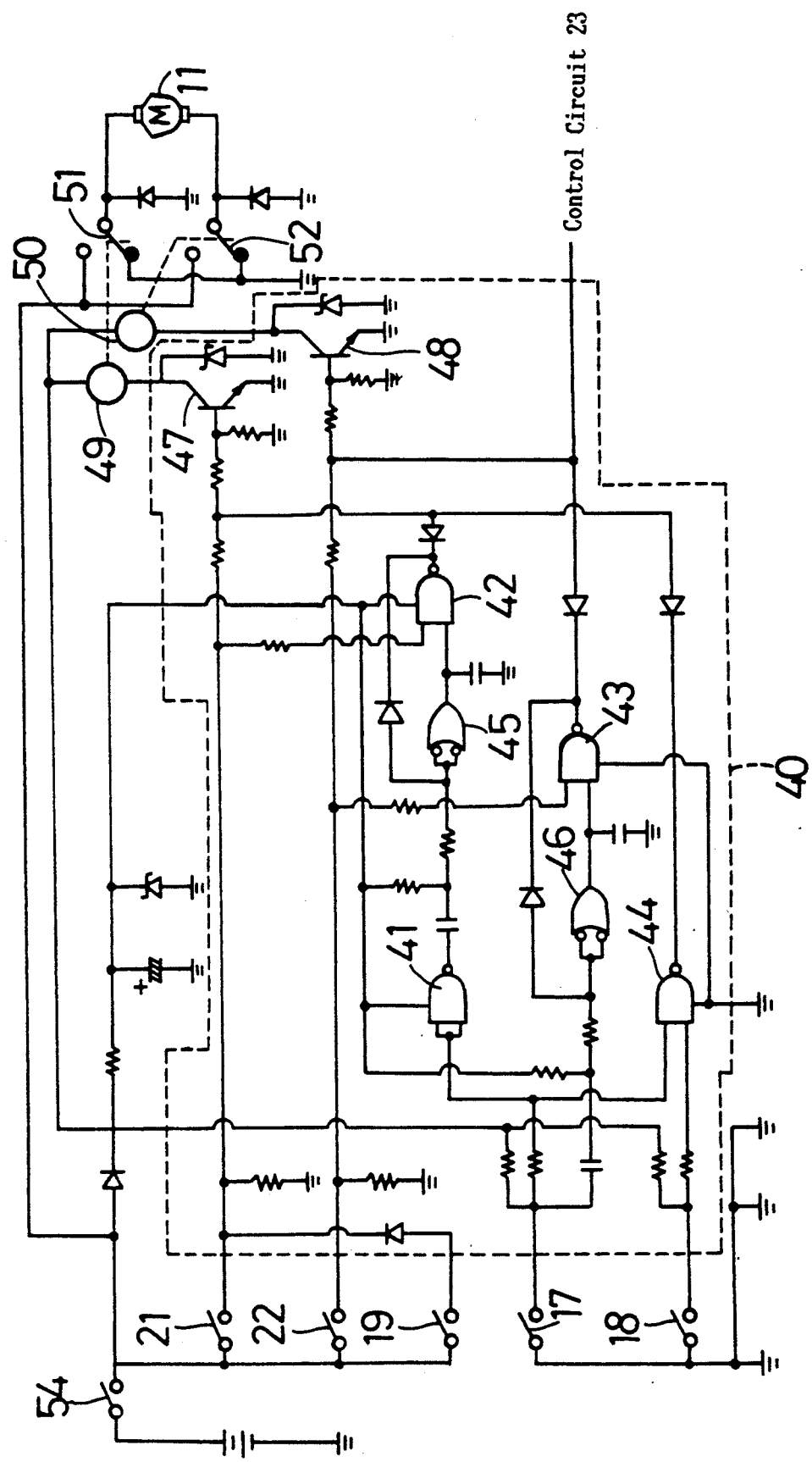
FIG. 6 is a circuit diagram for controlling a motor to drive the sunshade member.

The numeral 23 designates a control circuit for controlling the motor 8 to open/close the panel 3, specifically, for controlling rotations of the motor 8 in normal or reverse direction in response to input acts on switches 19, 20 and the ON/OFF acts by the limit switches 15, 16. The control circuit 23 is, as shown in FIG. 5, comprised of NOT elements 24 to 28, NAND elements 29 to 32, transistors 33, 34, and relays 35, 36 which are each provided with contacts 37, 38. The numeral 40 designates a control circuit for controlling the motor 11 to open/close the sunshade 4, specifically, for controlling rotations of the motor 11 in normal or reverse direction in response to input acts on switches 21, 22 and the on/off acts by the limit switches 17, 18. The control circuit 40 is, as shown in FIG. 6, comprised of NAND elements 41 to 44, OR elements 45, 46, transistors 47, 48, and relays 49, 50, and thereby the motor 11 for the sunshade 4 is controlled to rotate in normal or reverse direction in response to input acts on the switches 17, 18. In addition, the control function of working the sunshade motor 11, in response to an ON act on the panel switch 19, for opening the sunshade 4 to a predetermined position, depending on a location of the sunshade 4, and the control function of impeding the sunshade motor 11 from working for closing the sunshade 4, in response to an ON act on the sunshade switch 22 for closing while the panel 3 is in an open state, that is, D or E position. Further other control functions are provided with the circuit 40, of which explanations will be given below with reference to electrical operations involved. The relays 49, 50 are provided with contacts 51, 52, and 53, 54 designate the source switches.

Now referring to the operations caused by switch inputs, first, to operations for the opening process of the panel 3. An ON act on the panel opening switch 19, effective only for the period that the switch 19 is acted on, causes the panel motor 8 to work for opening the panel 3 (in the direction of the arrow mark a or b in FIG. 2). That is, the ON act at the switch 19 for opening the panel 3 causes the transistor 33 to become ON in the circuit 23 (FIG. 5) and the relay 35 is energized, of which the contact 37 is shifted to ON side, the panel motor 8 starts rotation in the normal direction. Then, assume that the act on the switch 19 takes place when the panel 3 is located at the full close position A or in the ajar tilt positions B, the motor 8 for the panel 3 advances the tilting of the back end of the panel 3 upward to arrive at the C position as indicated by the arrow mark b. When the tilt-up position C is reached, the limit switch 15 becomes ON, and the output of the NAND element 29 in the circuit 23 fades, and thence the transistor 33 becomes OFF, and the relay 35 is deenergized, of which the contact 37 returns, and the panel motor 8 stops, and the panel 3 stays at the tilt-up position C. Then, a re-act on the panel opening switch 19 causes the panel motor 8 again to rotate in the normal direction, and in turn the panel 3 advances sliding backward to achieve the full open D.

At the time of re-act on the switch 19, assuming that the sunshade 4 is located in the full close position F or in the first ajar positions H (that is, an opening degree is less than 50 mm), the transistor 47 becomes ON in the circuit 40, and the relay 49 is energized, and the contact 51 is shifted to ON side, and thus the sunshade motor 11 works in the normal direction for opening, and in turn, the sunshade 4 opens to arrive at the 50 mm ajar position I as indicated by the arrow c. The arrival of the sunshade 4 at the 50 mm ajar position I causes the limit switch 17 to become OFF, and the output of the NAND element 42 in the circuit 40 fades, and thence the transistor 47 becomes OFF, and relay 49 is deenergized and the contact 51 returns. Thus, the sunshade motor 11 stops and the sunshade 4 stays at the 50 mm ajar position I, which position will alternatively be noted the median ajar position I as is mentioned before.

Therein, assume that the sunshade 4 is located at the 50 mm ajar position I, or the second ajar positions J, or the full open position G, the output of the NAND element 42 is faded, and thence an ON act on the panel switch 19 does not cause the sunshade motor 11 to work, and the sunshade 4 stays as it is.

An ON act on the panel opening switch 19 while the panel 3 is located at the tilt-up position C, or the tilt-up and ajar open positions E causes the panel 3 to slide to arrive at the full open position D as indicated by the arrow b. Continuous act on the switch 19 causes the panel motor 8 to do idling.

Assume such a situation as the panel 3 is located at the tilt-up position C, or the tilt-up and ajar open positions E and at the same time, the sunshade 4 is located at the 50 mm ajar position I, or the second ajar positions J, and assume that an ON act on the panel opening switch 19 takes place, the sunshade 4 slides by the sunshade motor 11 to arrive at the full open position G as indicated by the arrow c. The arrival at the full open position G causes the limit switch 18 to become OFF, and the output of the NAND element 44 fades, and thence the transistor 47 becomes OFF, and the sunshade motor 11 stops, and in turn, the sunshade 4 is stopped. Further if the sunshade 4 is located initially at the full close position G, the sunshade 4 stays as it is or continues stopping.

Referring to the closing process of the panel 3, the panel closing switch 20 is acted on, that is, an ON act on the switch 20 causes the transistor 34 to become ON in the control circuit 23, and the relay 36 is energized, and the contact 38 is shifted to ON side, and thus the panel motor 8 rotates in the reverse direction, and in turn, the panel 3 slides forward to close the open area. Assume continuous act on the panel closing switch 20 causes the panel 3 to advance in the close direction (opposite to the arrows a and b), and the arrival at the full close position A causes the limit switch 16 to become OFF, and thus the output of the NAND element 30 fades, and the transistor 34 becomes OFF, and in turn, the panel motor 8 stops.

Therein, the panel motor 8 does not work if the panel 3 is located initially at the full close position A. Further, the act on the panel closing switch 20 does not effect the sunshade 4, that is, the sunshade 4 stays as it is.

Referring to the opening process of the sunshade 4, an ON act on the sunshade opening switch 21 causes the transistor 40 to become ON in the circuit 40, and the relay 49 is energized, and thus the contact 51 is shifted to ON side, and in turn, the sunshade motor 11 works in the normal direction, and the sunshade 4 slides backward as indicated by the arrow c to make an open area. The sunshade motor 11 rotates in the normal direction for the period that the switch 21 is acted on. Thence the sunshade 4 is permitted to pass H, I, and J positions. The arrival at the full open position G of the sunshade 4 causes the limit switch 18 to become OFF, and the output of NAND element 44 fades, and thus, the transistor 47 becomes OFF, and the sunshade motor 11 stops. In turn, the sunshade 4 stops, wherein the sunshade motor 11 is not energized while the sunshade 4 is located at the full close position G. Referring to the closing process of the sunshade 4, an ON act on the sunshade closing switch 22 causes the transistor 48 to become ON in the circuit 40, and the relay 50 is energized, and thus the contact 52 is shifted to ON side, and in turn, the sunshade motor 11 works in the reverse direction, and the sunshade 4 slides forward to close the open area, the opposite to the arrow c. The sunshade motor 11 rotates in the reverse direction for the period that the switch 22 is acted on.

Then, if the panel 3 is located at the full close position A at the start, the output of the NAND element 43 in the circuit 40 is active so that the sunshade motor 11 continues the reverse rotation until the sunshade 4 reaches the full close position F, and thereafter the sunshade motor 11 does idling.

An ON act on the sunshade closing switch 22 while the panel 3 is located in the ajar tilt positions B or at the tilt-up position C causes the sunshade 4 to reach the 50 mm ajar position I, not full closure. At this position, the limit switch 17 becomes ON, and in turn, the output of the NAND element 43 fades in the circuit 40, and thus the transistor 43 becomes OFF, and the sunshade motor 11 stops so that the sunshade 4 stays at the 50 mm ajar position I. If the sunshade 11 is located initially at the 50 mm ajar position I, the sunshade 11 does not move.

Further, an ON act on the sunshade closing switch 22 while the panel 3 is located in the tilt-up and ajar positions E or at the full open position D does not cause the sunshade 4 to slide, because the limit switches 16, 17 are OFF, and the output of the NAND element 32 fades in the circuit 23, and in turn, the transistor 48 in the circuit 40 does not become ON, and as a result, no action takes place on the sunshade 4.

In the above descriptions, the invention is illustrated with the sun roofing apparatus of tilt to slide type, but the invention may be applied to other action types without modifying the inventive ideas as disclosed herein.

What is claimed is:

1. A sunshade open/close control device for a vehicle sun roofing apparatus including a panel and a sunshade to open/close an opening provided in a vehicle roof, and a panel actuation motor for opening/closing the panel in response to panel opening/closing switches; comprising a sunshade actuation motor for opening/closing the sunshade, sunshade opening/closing switches, and a control circuit, said control circuit being provided for driving the sunshade actuation motor in opening and closing direction s in response to actuating of said sunshade opening/closing switches, and for causing the sunshade to reach a preselected position in dependence on a location of the sunshade existing at the time that the sunshade opening/closing switches are actuated in response to an opening command at the panel opening/closing switches; wherein said control circuit controls both forward and reverse operation of the panel actuation motor and the sunshade actuation motor for producing opening and closing movements of both the panel and the sunshade.

2. A sunshade open/close control device as defined in claim 1, wherein switching-on of a panel opening switch while the panel is located at a full close position (A) or in ajar tilt positions (B) causes the panel to tilt up further to arrive at tilt-up position (C).

3. A sunshade open/close control device as defined in claim 2, wherein switching-on of a panel opening switch while the panel is located at a full close (A) position or in ajar tilt positions (B) and while the sunshade is located at a full close position (F) or in first ajar positions (H) causes the sunshade to open to arrive at a median ajar position (I) in unison with the panel.

4. A sunshade open/close control device as defined in claim 1, wherein switching-on of panel opening switch while the panel is located at a tilt-up position (C) or in a tilt-up and ajar open positions (E) causes the panel to arrive at a tilt-up and full open position (D).

5. A sunshade open/close control device as defined in claim 4, wherein switching-on of a panel opening switch while the panel is located at a tilt-up position (C) or in a tilt-up and ajar open positions (E) and while the sunshade is located at a median ajar position (I) or in second ajar open positions (J), causes the sunshade to arrive at a full open position (D) in unison with opening action of the panel.

6. A sunshade open/close control device as defined in claim 1, wherein switching-on of on a sunshade opening switch causes opening action of the sunshade, and if the sunshade arrives at a full open position (G) in the meantime, the opening action of the sunshade stops.

7. A sunshade open/close control device as defined in claim 1, wherein switching-on of a sunshade closing switch causes closing action of the sunshade only while the sunshade closing switch is acted on, and if the sunshade arrives at a full close position (F) in the meantime, the closing action of the sunshade stops.

8. A sunshade open/close control device as defined in claim 1 wherein switching-on of a sunshade closing switch while the panel is located at a full close position (A) causes closing action of the sunshade to arrive at its full closing position (F).

9. A sunshade open/close control device as defined in claim 1, wherein switching-on of a sunshade closing switch while the panel is located in ajar tilt positions (B) or at a tilt-up position (C) causes closing action of the sunshade to arrive at a median ajar position (I).

10. A sunshade open/close control device as defined in claim 1, wherein switching-on of a sunshade closing switch while the panel is located in tilt-up and ajar open positions (E) or a tilt-up and full open position (D) causes no action of the sunshade.

11. A sunshade open/close control device for a vehicle sun roofing apparatus including a panel and a sunshade to open/close an opening provided in a vehicle roof, and a panel actuation motor for opening/closing the panel in response to panel opening/closing switches; comprising a sunshade actuation motor for opening/closing the sunshade, sunshade opening/closing switches, and a control circuit, said control circuit being provided for driving the sunshade actuation motor in opening and closing directions in response to actuating of said sunshade opening/closing switches, and for causing the sunshade to reach a preselected position in dependence on a location of the sunshade existing at the time that the sunshade opening/closing switches are actuated in response to an opening command at the panel opening/closing switches; wherein an ON command while the panel is located at a full close position or in ajar tilt positions and while the sunshade is located at a median ajar position (I) or in second ajar positions (J) or at a full open position (G), causes the sunshade to stay at its existing position by keeping the sunshade actuation motor from operating.

12. A sunshade open/close control device for a vehicle sun roofing apparatus including a panel and a sunshade to open/close an opening provided in a vehicle roof, and a panel actuation motor for opening/closing the panel, and a first control circuit for controlling the panel actuation motor in response to panel opening/closing switches; comprising a sunshade actuation motor for opening/closing the sunshade, sunshade opening/closing switches, and a second control circuit, said second control circuit being provided for driving the sunshade actuation motor in an opening/closing directions in response to actuating of said sunshade opening/closing switches, and for causing the sunshade to reach a preselected position in dependence on a location of the sunshade existing at the time that the sunshade opening/closing switches are actuated in response to an opening command at the panel opening/closing switches; wherein movements of the panel in unison with the sunshade in both opening and closing directions are caused by a combination of the first and second control circuits.

13. A sunshade open/close device control device as defined in claim 12, wherein switching-on of a panel opening switch while the panel is located at a tilt-up position (C) or in a tilt-up and ajar open positions (E) causes the panel to arrive at a tilt-up and full open position (D).

14. A sunshade open/close control device as defined in claim 12, wherein switching-on of a sunshade closing switch while the panel is located at a full close position (A) causes closing action of the sunshade to arrive at its full closing position (F).

15. A sunshade open/close control device as defined in claim 12, wherein switching-on of a sunshade closing switch while the panel is located in ajar tilt positions (B) or at a tilt-up position (C) causes closing action of the sunshade to arrive at a median ajar position (I).

16. A sunshade open/close control device as defined in claim 12, wherein switching-on of a sunshade closing switch while the panel is located in tilt-up and ajar open positions (E) or a tilt-up and full open position (D) causes no action of the sunshade.

* * * * *

UNITED STATES PATENT AND TRADEMARK OFFICE
CERTIFICATE OF CORRECTION

PATENT NO.   : 5,250,882
DATED        : Oct. 5, 1993
INVENTOR(S)  : Kozo Odoi, et al It is certified that error appears in the above-indentified patent and that said Letters Patent is hereby corrected as shown below:

On title page, item [73] should read as follows:
--Daikyo-Webasto Co., Ltd.; Mazda Motor Corporation, both of Hiroshima, Japan--

Signed and Sealed this

Twelfth Day of April, 1994

Attest:

BRUCE LEHMAN

*Attesting Officer*   *Commissioner of Patents and Trademarks*